(12) United States Patent
Dassanayake et al.

(10) Patent No.: US 6,497,503 B1
(45) Date of Patent: Dec. 24, 2002

(54) HEADLAMP SYSTEM WITH SELECTABLE BEAM PATTERN

(75) Inventors: Mahendra Somasara Dassanayake, West Bloomfield, MI (US); Paul Mulvanny, Northants (GB); Sheran Anthony Alles, Westland, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/681,901

(22) Filed: Jun. 21, 2001

(51) Int. Cl.[7] .................. B60Q 1/00; F21V 21/28; F21V 21/29
(52) U.S. Cl. .............. 362/465; 362/276; 362/510; 362/516; 362/514; 362/284
(58) Field of Search .................. 362/20, 21, 276, 362/465, 293, 510, 516, 512, 513, 514, 284, 324

(56) References Cited

U.S. PATENT DOCUMENTS

| 5,311,410 | A | | 5/1994 | Hsu et al. | |
|---|---|---|---|---|---|
| 5,713,654 | A | | 2/1998 | Scifres | |
| 5,828,485 | A | | 10/1998 | Hewlett | |
| 5,938,319 | A | * | 8/1999 | Hege | 362/459 |
| 6,254,259 | B1 | * | 7/2001 | Kobayashi | 362/465 |

* cited by examiner

*Primary Examiner*—Alan Cariaso
*Assistant Examiner*—Sharon Payne

(57) ABSTRACT

A headlamp system stores a plurality of beam patterns on a microprocessor 32 that selects a predetermined beam pattern based on driving conditions and sends the predetermined beam pattern to a digital micromirror device (DMD) 18 that is capable of generating the desired beam pattern by adjusting the position of individual pixels on the DMD 18. Several vehicle parameters are inputs 36, 37, 38, 29, 70 to the microcontroller 32 and are used to determine the appropriate beam pattern to be produced by the DMD 18 and projected by the headlamp system of the present invention.

3 Claims, 2 Drawing Sheets

HEADLAMP SYSTEM WITH SELECTABLE BEAM PATTERN

BACKGROUND OF INVENTION

The present invention relates generally to a headlamp system, and more particularly to a headlamp system having a plurality of digitally stored beam patterns.

There are several beam patterns necessary for a vehicle's headlamps, such as high beams, low beams, turning beams, fog beams, daytime running beams, and others. In addition, there are different standards for beams outside of the U.S. For example, European beam requirements are different from Japanese beam requirements, and both are different from U.S. requirements. Currently, different lamps must be used or complicated beam adjustments must be made to the headlamp system for adjusting the beam patterns as desired.

Current technology for headlamp beam adjustment employs mechanical adjustments to the beam patterns. For example, multiple lamps, lenses, and motors are used to steer the lamps and lenses in order to provide the desired beam pattern. For example, a motor is used to steer a lamp to illuminate a corner when making a turn. The mechanical steering system typically includes auto-leveling systems, left-right actuation motors, a long wave infra red (LWIR) camera and other mechanical light aiming devices. These systems are not only complex and costly, but they also require significant packaging space thereby complicating packaging constraints.

Thus there is a need for a simplified system and method for providing a plurality of headlamp beam patterns. In addition, there is a need for providing a predetermined or desired headlamp beam pattern from a plurality of stored patterns upon demand.

SUMMARY OF INVENTION

It is an object of the present invention to deliver a predetermined beam pattern to a headlamp. It is another object of the present invention to digitally store a plurality of headlamp beam patterns that are activated and delivered to a headlamp upon demand.

It is a further object of the present invention to utilize a digital micro-mirror device to store and change beam shapes to a desired headlamp beam pattern. It is still a further object of the present invention to use appropriate vehicle parameters to determine the proper headlamp beam pattern to be delivered to and displayed by the headlamp system.

In carrying out the above objects and other objects and features of the present invention a method and system for providing a predetermined headlamp beam pattern using light distribution optics from a digitally stored beam pattern in a digital light processor is provided. The present invention is applicable to conventional headlamp systems for providing an improved method of creating and displaying high beam, low beam, fog lamp, daytime running lamp patterns, as well as side beams for turning without the need for added lamps and complicated motors.

The present invention is especially applicable to a high intensity discharge (HID) lighting system which uses a centralized HID light source that is integrated with drive electronics. A light source is coupled to a bundle of fibers that deliver light to a headlamp, or a terminated fiber optic bundle, to form a headlamp beam pattern. According to the present invention, the output of the headlamp is controlled by a digital beam pattern that is stored on a microprocessor and processed upon demand by a digital micromirror device (DMD). The DMD is capable of generating a plurality of beam patterns that can be created by adjusting the position of individual pixels on the DMD.

Several vehicle parameters can be used as inputs to the microcontroller in order to determine the appropriate beam pattern to be produced by the DMD and projected by the headlamp system. In addition, the beam pattern created according to the present invention is better defined and more precise due to the fact that each pixel in a pixel array on the DMD is addressable by the microcontroller.

Another advantage of the present invention is the flexibility provided in storing predetermined beam patterns and commanding the headlamp system to display the desired pattern upon demand. In addition, the headlamp system is simplified over systems known in the art, because there is no need for auto-leveling systems, left-right actuation motors, LWIR cameras and other mechanical light aiming devices employed used in the prior art. Also, any electromagnetic interference that was of concern with the motors used in the prior art is eliminated.

Other objects and advantages of the present invention will become apparent upon reading the following detailed description and appended claims, and upon reference to the accompanying drawings.

BRIEF DESCRIPTION OF DRAWINGS

For a more complete understanding of this invention, reference should now be made to the embodiments illustrated in greater detail in the accompanying drawings and described below by way of examples of the invention. In the drawings.

DETAILED DESCRIPTION

Figure 1:
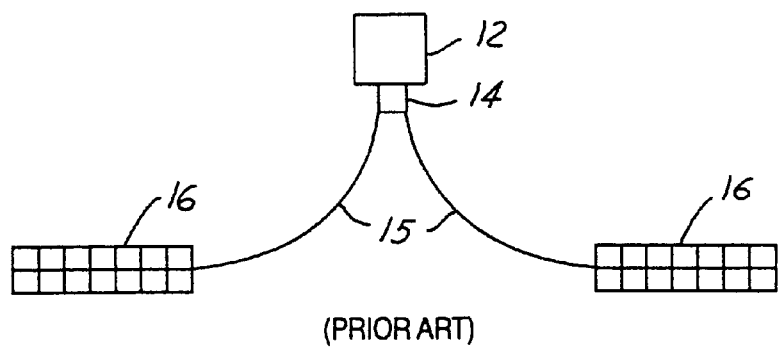
FIG. 1 is a block diagram of a typical HID headlamp system to which the present invention applies.

FIG. 1 is a block diagram of a prior art headlamp system 10 to which the present invention applies. The headlamp system 10 has a light source 12 having single port 14 for fiber optic transmission of light by way of a light pipe 15 to a headlamp 16. While the present invention is being described herein with reference to a HID fiber optic light headlamp system having a single port light source, it should be noted that the present invention is also applicable to other headlamp systems and other configurations of headlamp light sources other than those shown and described herein. One skilled in the art is capable of applying the present invention to a variety of headlamp systems and recognizing the advantages of the invention described herein.

Figure 2:
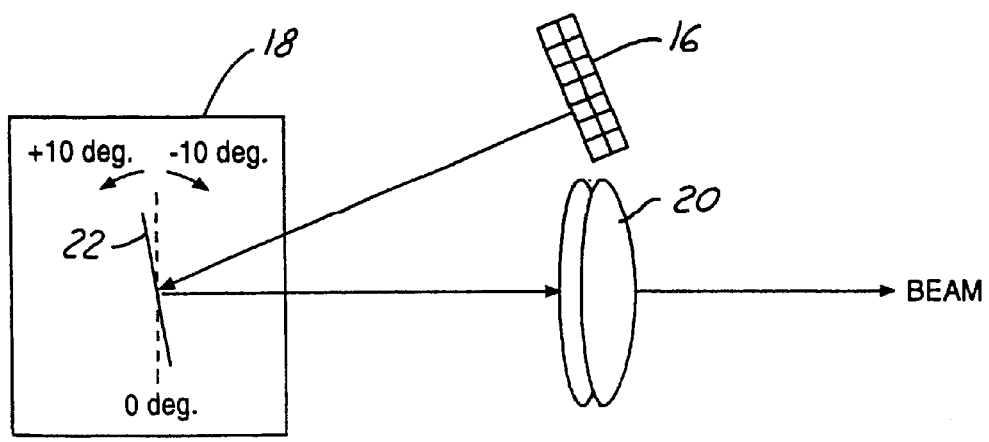
FIG. 2 is a block diagram of the beam shaping headlamp system of the present invention.

Referring now to FIG. 2, in the headlamp system 17 of the present invention, the headlamp 16 supplies light to a digital micromirror device (DMD) 18. In the preferred embodiment the DMD is a digital light processor such as the Texas Instruments, Inc. DLP light processing chip, which is a digital micromirror device 18 that modulates micromirrors, or pixels, at a very high rate of speed. However, any selectively controlled multiple-reflecting element may be substituted. The DMD 18 reflects the light from the headlamp 16 in a predefined beam pattern to a lens system 20 for projection.

The DMD is an array of small movable mirrors, called micromirrors or pixels that are configured to project or deflect light to create the desired predefined beam pattern. A single pixel 22 in the DMD is shown in FIG. 2. Each pixel 22 is movable between a flat position in which light is projected and a position other than flat in which light is deflected away. A combination of strategically positioned pixels creates the beam pattern. The flat (0 degrees) position is indicated by the vertical dashed line, a positive position other than flat is shown as the solid line, and a negative position other than flat is not shown. Plus or minus 10 degrees is typical for the two states other than flat. According to the present invention, the micro-mirrors in the array of mirrors are positioned in a combination of the three states to create a beam pattern.

Figure 3A:
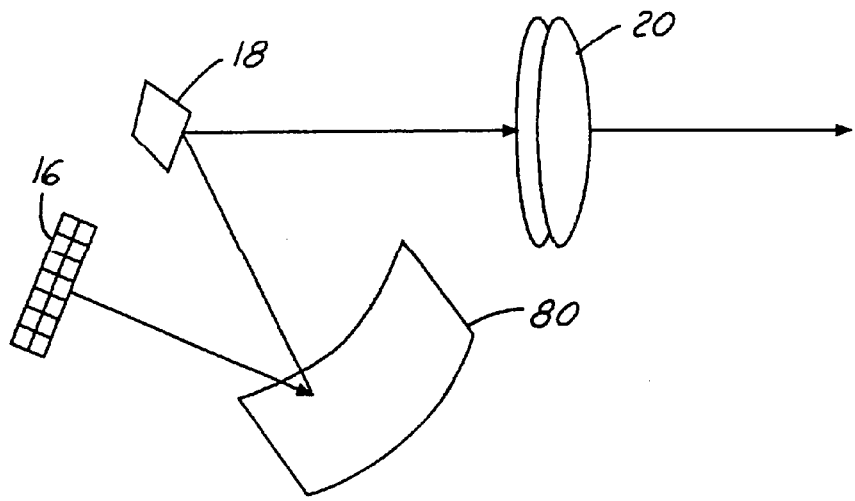
FIG. 3a is a block diagram of a configuration of the present invention including illumination optics.
Figure 3B:
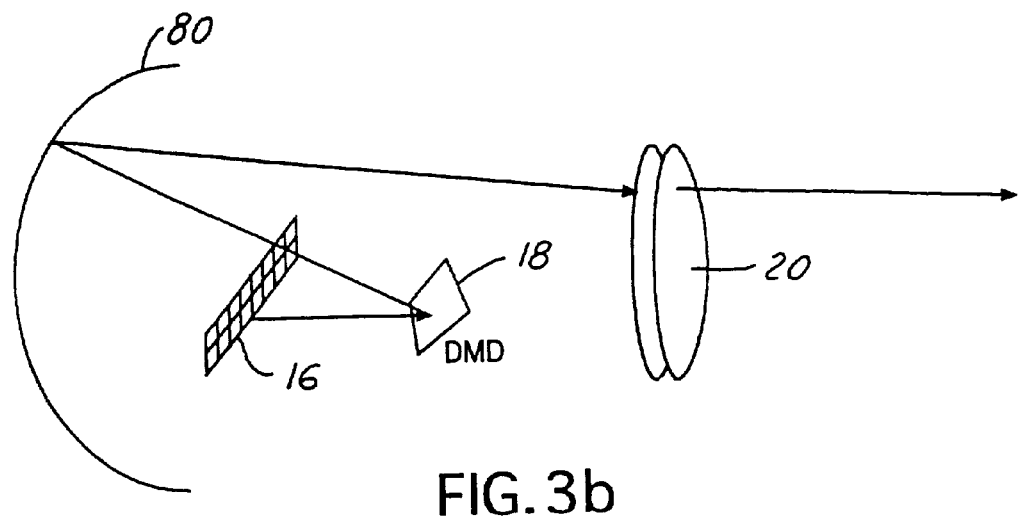
FIG. 3b is a block diagram of another configuration of the present invention including illumination optics.

Packaging constraints on a vehicle will dictate the arrangement of the headlamp system of the present invention. FIGS. 3a and 3b show possible arrangements of the present invention that include illumination optics 80. It may be necessary to use illumination optics 80 in combination with the DMD 18 to orient these elements with respect to the light source 12. FIGS. 3a and 3b show two possible arrangements, but one skilled in the art is capable of using a multitude of configurations to achieve the best possible configuration as defined by the packaging constraints for the headlamp system.

Figure 4:
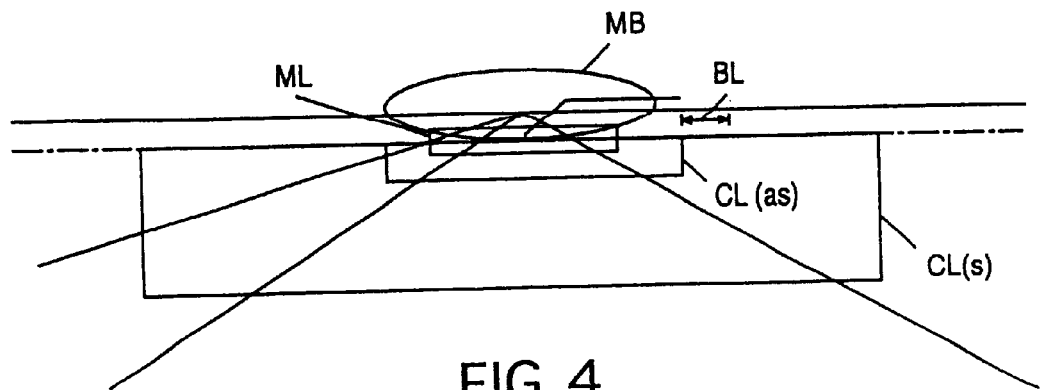
FIG. 4 is an example of a series of beam patterns that may be generated according to the present invention.

FIG. 4 is an example of a series of beam patterns that may be desired for a headlamp system. According to the present invention, several beam patterns are stored and accessed as necessary for projection upon demand. For example, a symmetric country light (CLs) pattern, an asymmetric country light (Clas) pattern, a main beam (MB), a motorway light (ML), and a dynamic bending (BL) of the light, as required during cornering a vehicle. Other examples not shown include, but are not limited to, a high beam pattern, a low beam pattern, a turning beam pattern, a European beam pattern, a fog beam pattern, near infra red beam pattern, a Japanese beam pattern, etc. These are just a few examples of predefined patterns that can be stored, accessed upon demand, and projected according to the present invention.

Figure 5:
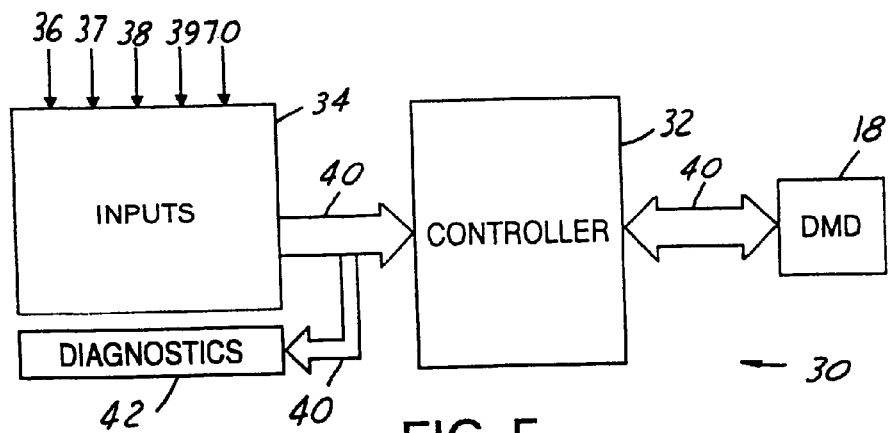
FIG. 5 is a flow diagram of the method of the present invention.

Referring to FIG. 5 there is shown a flow diagram 30 of the headlamp beam pattern control according to the present invention. A microcontroller 32 stores the plurality of predetermined beam patterns. The patterns contain the information for the positions of the individual pixels on the DMD 18.

The patterns are accessed when necessary depending on lighting and driving conditions. According to the present invention, a variety of driver and sensor inputs 34 are used to determine which beam pattern should be provided to the DMD 18 for projection by the headlamp system. For example, steering angle 36, vehicle speed 37, light sensor input 38, driver inputs 39, etc. can all be used to determine the beam pattern to be projected. A bus 40 is used to communicate data from the inputs 34 to the microcontroller 32, and the DMD 18.

It is also possible according to the present invention to include a diagnostic system 42 that may be used to identify failures and mode changes in the beam pattern in the lighting system. In this respect, failures, such as a burned-out lamp, turn signal, etc. can be communicated to the driver, in addition to the display mode of the beam that is presently projected.

The driver and sensor inputs 34 are communicated to the microcontroller 32 by way of the bus 40. The inputs reflect the driver's environment, wants and the driving conditions. The inputs 34 are used to determine the beam pattern that is most applicable to the current environment and driving conditions. The bus 40 communicates the selected beam pattern and sends the pattern to the DMD 18 where the micromirrors are adjusted accordingly. The result is the projection of a beam pattern that optimizes the driver's visibility based on the surrounding environment and driving conditions.

The present invention provides a significant advantage over conventional headlamp systems. According to the present invention, the headlamp system projects the desired beam pattern by slight movements of the pixels on the DMD. Conventional headlamp systems would require complex movements of motors, mirrors, lenses, lamps, etc.

Another advantage is realized in the ease of improving a driver's field of view by illuminating around corners when a vehicle is turning. According to the present invention, it is possible to sense the steering angle and communicate that information as an input 36 to the microcontroller 32. The microcontroller can select the appropriate beam pattern and communicate it to the DMD in order to control the dynamic bending of the beam pattern such that merely by changing the pixel configuration on the DMD, the desired beam pattern is produced and projected by the headlamp system.

Another example of the adaptability of the present invention is that as the speed of the vehicle increases, the driver needs to see a further distance in front of the vehicle. According to the present invention, the depth of the beam can be controlled by providing vehicle speed as an input 37 to the microcontroller 24 for use in the decision making process for selecting and accessing a desired beam pattern.

Further, a light sensor input 38 may be used to enable daytime running lamps, such as when the outside light weakens, or the vehicle is passing through a long tunnel, and the driver needs more light to illuminate the field of view. The microcontroller can adjust the beam pattern based on the ambient light level sensed by the light sensor.

The present invention activates beam patterns as they are needed depending on the driving situation, visibility needs and conditions, vehicle parameters, driver inputs, etc. According to the system and method of the present invention, the stored beam patterns are accessed by the microcontroller 32, sent to the DMD 18 where they are created and projected by a lens system in the headlamp system not shown in FIG. 5. There is no need for auto-leveling systems, left-right actuation motors, LWIR cameras, or any other possible mechanical light aiming device that are typically used in conventional headlamp systems to accomplish similar results.

Figure 6:
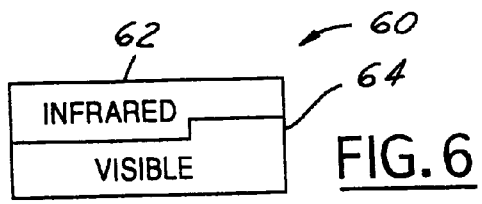
FIG. 6 is a diagram of a segment of light pipe.

In another embodiment of the present invention, infrared coating may be applied to a portion of the light pipe supplying light to the headlamp. Referring to FIG. 6 there is shown a segment 60 of the light pipe. The light pipe is divided into an infrared portion 62 and a visible portion 64. The infrared portion 62, which is coated with an infrared coating, of the light pipe supports night vision without the need for excessive additional equipment. According to this embodiment of the present invention, when night vision is desired, the microcontroller sends the DMD instructions to position pixels to reflect the IR portion of the light from the light pipe, thereby providing night vision. When night vision is not needed, the pixels on the DMD are positioned such that they do not reflect the light from the IR portion of the light pipe.

In yet another embodiment of the present invention, closed-loop control is possible. Referring back to FIG. 5, a camera input 70 is used to provide closed-loop feedback to the microcontroller 32 which can be used for making decisions on the desired beam pattern to be communicated to and supplied by the DMD 18.

Clearly the present invention provides the advantages of an adaptive lighting system without the need for expensive additional hardware which unnecessarily complicates the headlamp system. The present invention is adaptable to a wide variety of environment and driving conditions. The present invention not only enhances visibility for the driver based on driving conditions, but also operates with less power than conventional systems, has greater light efficiency, and uses less packaging space on the vehicle than a conventional headlamp system. These advantages provide more flexibility in design, styling and reduces the cost associated with conventional headlamp systems.

The invention covers all alternatives, modifications, and equivalents, as may be included within the spirit and scope of the appended claims.

What is claimed is:

1. A headlamp system comprising:

a light source;

at least one headlamp coupled to said light source;

a digital micromirror device positioned to reflect light in a predefined beam pattern from said at least one headlamp;

a lens system for projecting said predefined beam pattern produced by said digital micromirror device;

a microcontroller in communication with said digital micromirror device;

a plurality of beam patterns stored on said microcontroller, said microcontroller having means for determining a desired beam pattern to be communicated to said digital micromirror device; and an infrared coating on a portion of said light source and wherein said means for determining a desired beam pattern further comprises a driver input request for night vision whereby said digital micromirror device reflects light from said light source emitted by said infrared portion of said light source.

2. A headlamp system comprising:

a light source, a portion of said light source having an infrared coating;

at least one headlamp coupled to said light source;

a digital micromirror device positioned to reflect light in a predefined beam pattern from said at least one headlamp;

optics positioned in a predetermined location with respect to said light source and said digital micromirror device;

a lens system for projecting said predefined beam pattern produced by said digital micromirror device;

a microcontroller in communication with said digital micromirror device;

a plurality of inputs from a plurality of sensors provided to said microcontroller;

a plurality of beam patterns stored on said microcontroller wherein said microcontroller selects a desired beam pattern from said plurality of beam patterns and communicates said desired beam pattern to said digital micromirror device and wherein said plurality of inputs further comprises a driver input for night vision, whereby said digital mirror device reflects light from said light source emitted by said infrared portion of said light source.

3. A method for projecting a headlamp beam pattern from a headlamp system having a light source with an infrared coating on a portion of said light source, at least one headlamp coupled to said light source; a digital micromirror device positioned to reflect light in a predefined beam pattern from said at least one headlamp; a lens system for projecting said predefined beam pattern produced by said digital micromirror device; a microcontroller in communication with said digital micromirror device; and a plurality of beam patterns stored on said microcontroller, said method comprising the steps of:

sensing a night vision input;

inputting said night vision input to said microcontroller;

selecting a predetermined beam pattern for night vision from said plurality of beam patterns stored on said microcontroller;

communicating said predetermined beam pattern for night vision to said digital micromirror device;

adjusting said digital micromirror device to create said predetermined beam pattern for night vision;

projecting said predetermined beam pattern for night vision from said lens system.

* * * * *